United States Patent

[11] 3,622,117

| [72] | Inventors | Lester N. Lerman;<br>Joseph A. Biagioni, both of Chicago, Ill. |
|---|---|---|
| [21] | Appl. No. | 811,771 |
| [22] | Filed | Apr. 1, 1969 |
| [45] | Patented | Nov. 23, 1971 |
| [73] | Assignee | Florence Art Company, Inc.<br>Chicago, Ill. |

[54] MEANS FOR MANUFACTURING PLASTIC CASTINGS WITH WINDOWS OR OPENINGS FORMED DURING THE CASTING PROCESS
2 Claims, 12 Drawing Figs.

[52] U.S. Cl. ................................................ 249/65,
249/112, 249/183, 264/313, 264/314
[51] Int. Cl. ....................................................... B29c 1/04,
B29c 1/12, B29c 1/14, B29c 5/00
[50] Field of Search............................................ 264/313,
338, DIG. 70, 314, 316; 18/47 C, DIG. 44, 26 R,
39; 249/112, 65, 183, 178; 25/122

[56] References Cited
UNITED STATES PATENTS

| 516,028 | 3/1894 | Smith | 18/DIG. 44 |
| 1,822,451 | 9/1931 | Oestnaes | 249/112 |
| 2,190,807 | 2/1940 | Steinberger | 264/316 |
| 2,289,990 | 7/1942 | Parker | 264/314 |
| 417,176 | 12/1889 | Haines | 249/112 |
| 2,712,159 | 7/1955 | Marsch | 264/318 X |
| 3,353,220 | 11/1967 | Lenoble | 18/DIG. 44 |

Primary Examiner—Robert F. White
Assistant Examiner—J. H. Silbaugh
Attorney—Max R. Kraus ABSTRACT: A means for manufacturing and producing plastic castings with windows or openings formed in the body of the casting during the casting process, which includes a mold having a hollow interior and an inflatable member positioned in said mold so that portions of the inflatable member are in contact with portions of the inside wall surface of the mold and other portions are not in contact, so that when the plastic material is introduced between the mold and the inflatable member the plastic material will fill and occupy the noncontacting surfaces to form the body of the casting while the contacting surfaces block out the areas for the casting material and form the openings or windows in the body or wall of the casting during the casting process so that when the casting is formed the openings or windows are preformed in the body thereof.

PATENTED NOV 23 1971 3,622,117

INVENTORS
LESTER N. LERMAN
JOSEPH A. BIAGIONI
BY
Max R. Kraus
ATTORNEY

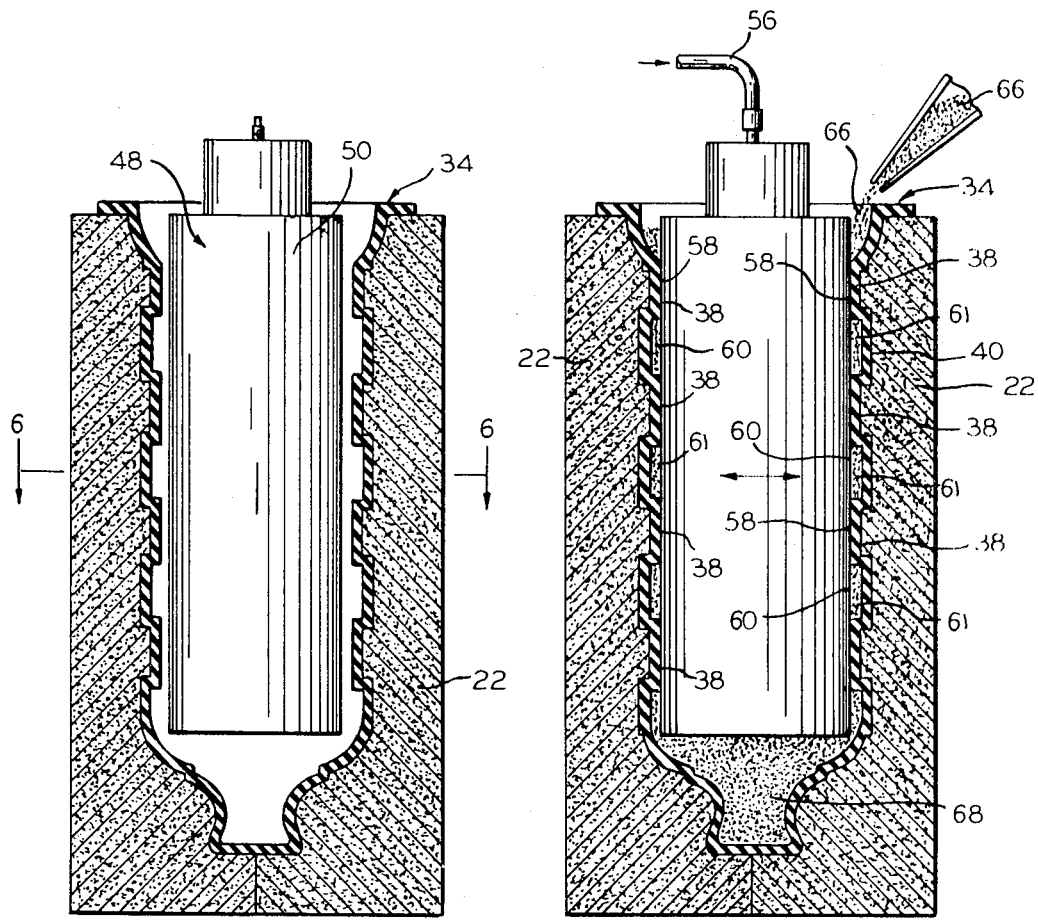
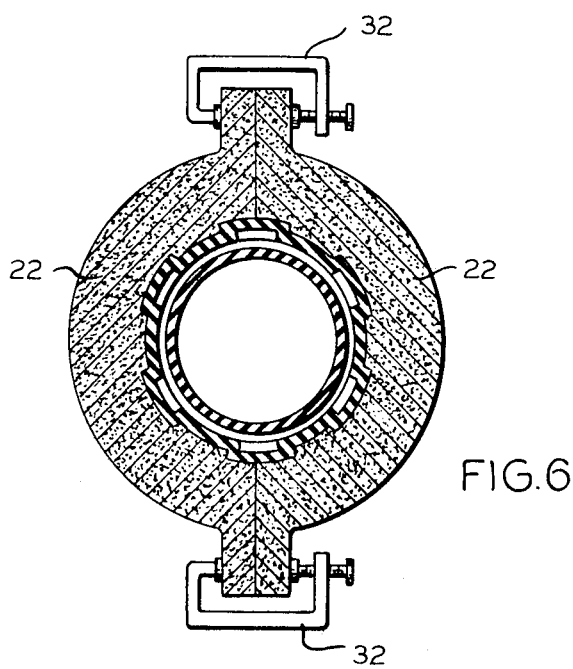
FIG.5   FIG.7
FIG.6
INVENTORS
LESTER N. LERMAN
JOSEPH A. BIAGIONI
BY
Max R. Kraus
ATTORNEY

PATENTED NOV 23 1971 3,622,117

INVENTORS
LESTER N. LERMAN
JOSEPH A. BIAGIONI

BY Max R. Kraus
ATTORNEY

MEANS FOR MANUFACTURING PLASTIC CASTINGS WITH WINDOWS OR OPENINGS FORMED DURING THE CASTING PROCESS

BRIEF SUMMARY OF THE INVENTION

In the casting of plastic for forming various art objects, including lamp bases and the like, it was heretofore not possible to form the casting with openings or windows in the body of the casting. If it was desired to provide such openings or windows in the body or wall of the casting or casted article it would have to be done manually after the casting was removed from the mold. This added greatly to the cost of producing such a product.

One of the objects of this invention is to provide a means within which the openings or windows in the body or wall of the casting are formed during the casting process so that when the casting is removed from the mold it is already provided with the openings or windows therein. This invention therefore reduces the cost or producing such a product and increases the production capacity as compared to the prior methods.

With the foregoing and other objects which will appear as the description proceeds, the invention consists of certain novel features of construction, arrangement and a combination of parts hereinafter duly described, illustrated in the accompanying drawings, and particularly pointed out in the appended claims, it being understood that various changes in form, proportion, size and minor details of the structure may be made without departing from the spirit or sacrificing any of the advantages of the invention.

BRIEF DESCRIPTION OF THE DRAWINGS

In the drawings:

FIG. 5 is a view partly in section showing the outer shell, the mold therewithin, and the inflatable member inserted prior to being fully inflated and prior to the start of the casting process.

FIG. 6 is a sectional view taken on line 6—6 of FIG. 5.

FIG. 7 is a central sectional view similar to FIG. 5 but showing the inflatable member inflated and the casting material poured into the mold.

DESCRIPTION OF FIGS 1 THROUGH 10

Figure 4:
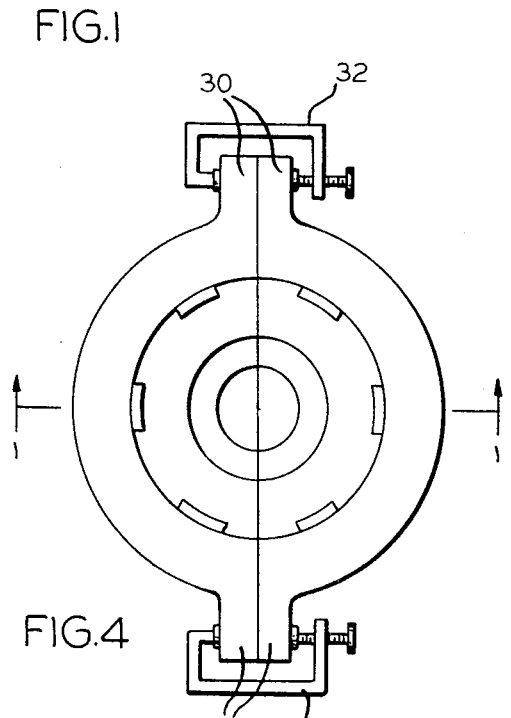
FIG. 4 is a top view showing the members of FIGS. 1, 2, and 3 in assemble relation, such as when casting.

The outer shell generally indicated at 20 is formed preferably of a plaster material and is formed of a plurality of segments or sections 22, preferably two, of identical shape and construction. Each of the segments or sections has an inside wall 24 which, in the illustration shown, is designed to accommodate the mold, to be described, to form a casting of the design shown in FIG. 10. The interior wall surface 24 of the outer shell is provided with spaced inwardly projecting surfaces 26 and spaced recesses 28. The interior wall 24 of the outer shell 20 is shaped complementary to the shape of the wall of the rubber mold, to be described, which is positioned inside and between the two segments of the outer shell. Each of the outer shell segments 22 has outwardly extending lips 30 so that when the two segments are put together they are held in such position by clamping means 32 engaging the lips of the segments, as best shown in FIG. 4. When the two segments 22 of the outer shell are clamped together the interior of the two segments forms a hollow body.

Figures 1, 2, 3:
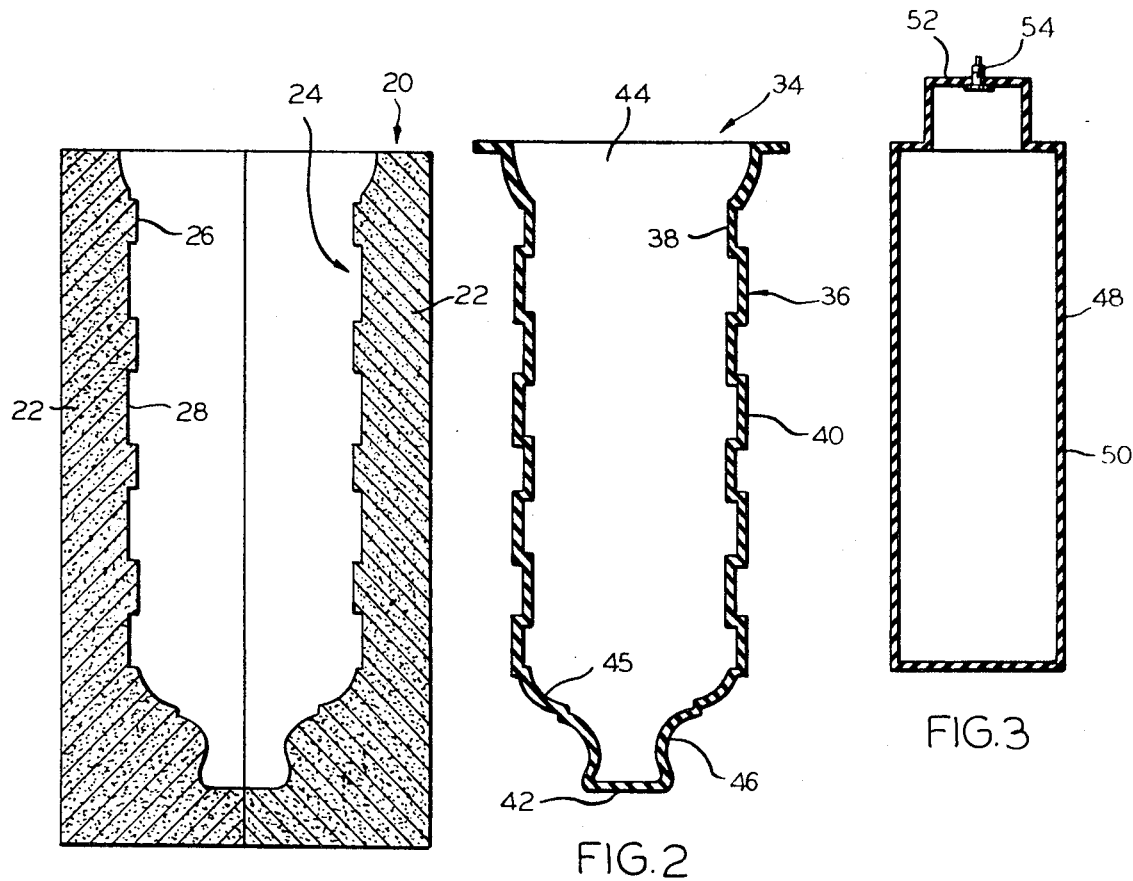
FIG. 1 is a central sectional view of the plaster outer shell.
FIG. 2 is a central sectional view showing the rubber mold.
FIG. 3 is a central sectional view of the inflatable rubber member.
Figure 10:
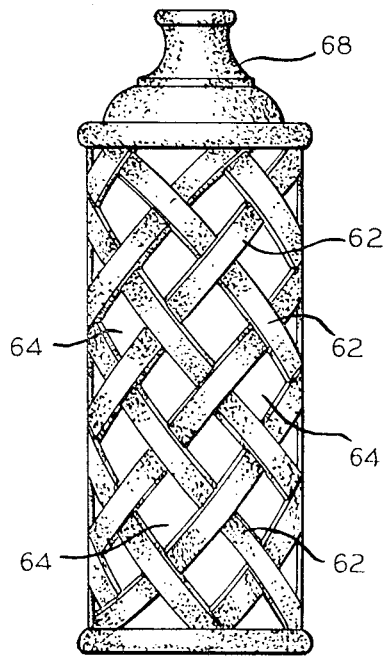
FIG. 10 is a view showing the finished product or casting formed in accordance with this invention, and particularly showing the openings or windows formed in the body of the casting so as to form a basket weave open design.
Figure 11:
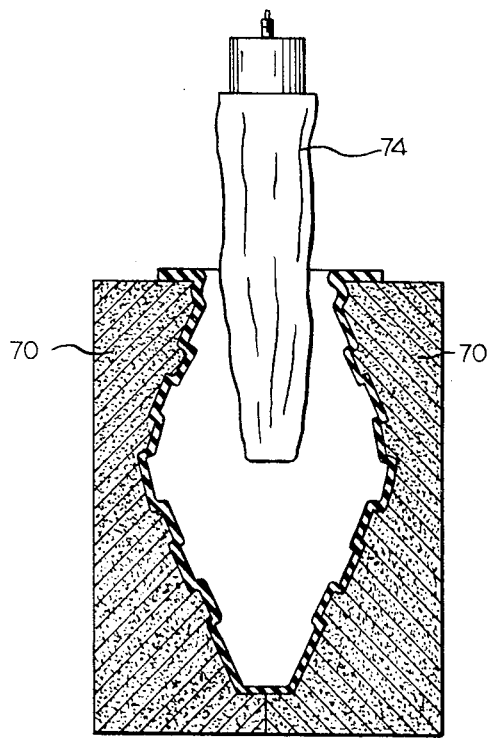
FIG. 11 is a central sectional view similar to FIG. 5 but showing different design.

The mold generally indicated at 34 and best shown in FIG. 2 is formed of rubber or other resilient material. The wall 36 of the rubber mold is shaped complementary to the shape of the outer shell, as the rubber mold is to be positioned in and encompassed within the outer shell, as shown in FIG. 5, during the casting process. The rubber mold 34 is adapted to produce a casted object of an open-basket weave design, as shown in FIG. 10. Obviously, the invention herein is not limited to a particular design as any shape or formation of design may be produced in accordance with the inventive concept, and the particular mold design shown in FIG. 2 and/or FIG. 11 is only for the purpose of illustration and not by way of limitation.

The rubber mold 34, as shown in FIG. 2, has its wall 36 shaped complementary to the inside wall of the outer shell 20 and is shaped to form inwardly extending spaced portions 38 and spaced recessed portions 40. The rubber mold is of generally cylindrical shape and is hollow. It has a closed end 42 at the bottom and is open as at 44 at the top. In the illustration shown, the bottom portion of the mold inclines inwardly from the cylindrical wall as at 45 and terminates in a reduced neck portion 46. The rubber mold 34 is positioned inside the outer shell 20 and is supported by the outer shell and the spaced portions 38 of the mold rest against the spaced portions 26 of the outer shell and the spaced portions 40 of the mold rest against the spaced portions 28 of the outer shell.

In practicing the process of this invention, the inflatable member 48 is inserted into the rubber mold 34 through the opening 44 in a semi-inflated condition. After the inflatable member is inserted into the mold, as shown in FIG. 5, it is then inflated to that shown in FIG. 7 by introducing air through an air tube 56 which is connected at one end to the valve 54 and at its opposite end is connected to an air pressure supply, and the air introduced into the inflatable member inflates said member so that the wall of the inflatable member engages portion of the inner wall of the mold.

In connection with the particular design to be formed, as best seen in FIG. 7, portions 58 of the cylindrical wall 50 of the inflatable member are in contact and engage the portions 38 of the inside wall of the mold. The remaining portions 60 of the cylindrical wall of the inflatable member are spaced from and are not in contact with the remaining portions 36 of the mold and, therefore, such portions define open areas 61 therebetween, which open areas are to be filled with the casting material and form the body if the casting, such body being formed with swirls, or the basket weave members 62 shown in FIG. 10, whereas the portions 38 of the mold where the inflatable member engages the inside of the mold are blocked out as the plastic material is prevented from coming therebetween. Therefore, the portions 38 of the mold, as shown in FIG. 7, will in the finished product become the open network or openings 64 throughout the body of the casted product. The plastic material 66 is introduced into the mold, as shown in FIG. 7, and will occupy the open spaces 61 between the inflatable member and the inner wall of the mold and will also flow into the lower end of the mold, as in FIG. 7, to form the solid neck 68 of the casting. Since the plastic material cannot come between the inflatable member and the mold in the areas 38 in contact with the spaced portions 26 of the outer shell, those areas will be blocked out and the openings or windows 64 in the casting will be formed therein.

The plastic material is allowed to harden while the mold is positioned, as shown in FIG. 7, and after the plastic material has hardened in the mold the inflatable member is partially deflated by causing the air therein to be vented through the valve 54 and in such deflated condition the inflatable member is withdrawn from the interior of the mold. The plaster outer shell segments or section are unclamped and separated exposing the rubber mold which is then stripped off from the casting leaving the casting as a finished product, such as shown in FIG. 10, with the body if the casting formed with the openings or windows 64 therein.

Figure 8:
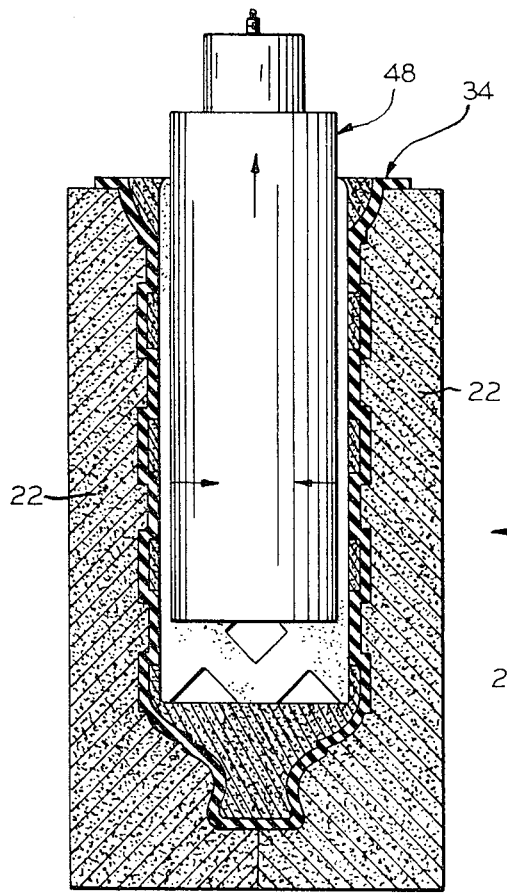
FIG. 8 is a view similar to FIG. 7 but showing the removal of the inflatable member after the casting has been formed in the mold.
Figure 9:
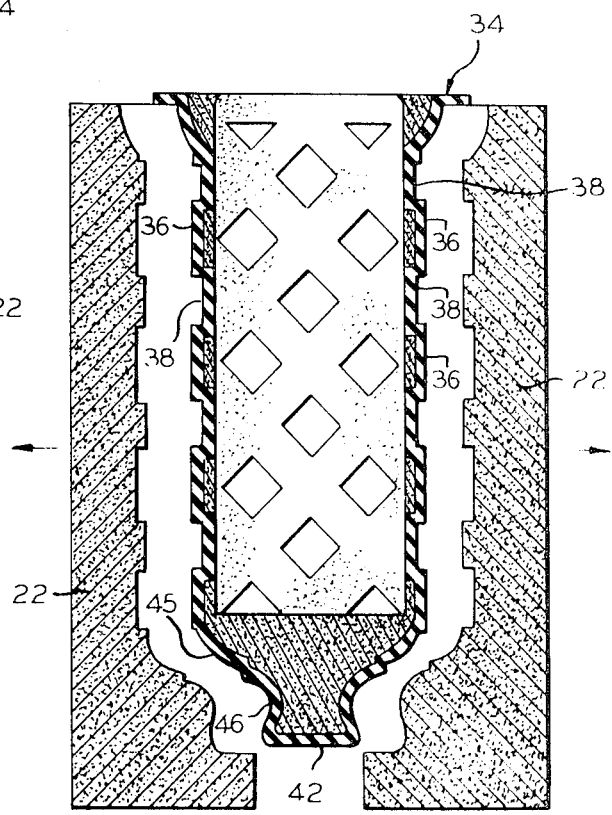
FIG. 9 is a view showing the outer shell separated during the initial removal of the casting.

FIG. 8 shows the deflating of the inflatable member and the partial withdrawal thereof from the mold, and FIG. 9 shows the separation of the outer shell from the mold.

An alternative method would be that instead of withdrawing the inflatable member 48 from the rubber mold 34, the inflatable member could be partially deflated and could be withdrawn together with the casting after the outer shell has been separated. The preferred method, however, is to deflate the inflatable member and withdraw it before removing the casting, as previously described.

DESCRIPTION OF FIGS. 11 THROUGH 13

Figure 12:
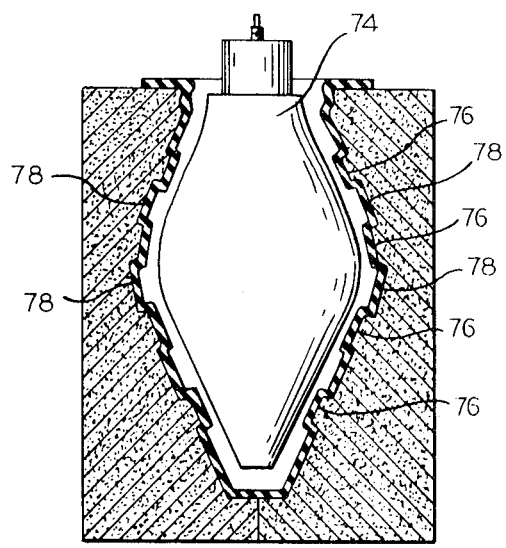
FIG. 12 is a view of the mold and inflatable member inserted therein to form the casting shown in FIG. 13.
Figure 13:
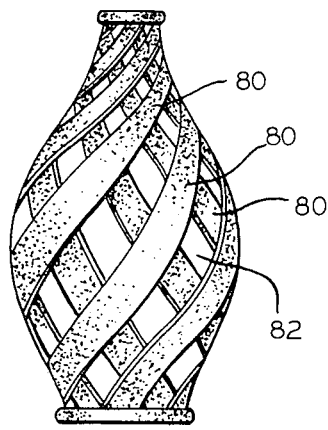
FIG. 13 is a view of a casting having the formation shown in the molds of FIGS. 11 and 12 and showing an openwork design.

FIGS. 11 through 13 show a different shape and configuration of a design, however, the procedure in the molding process is identical to that previously described. The segments 70 forming the plaster outer shell form a bellowed shape. The rubber mold 72 is supported in the outer shell. The inflatable member 74 is shown in deflated condition as it is being inserted into the mold, as shown in FIG. 11. In FIG. 12 it is shown partially inflated. However, before the casting process takes place the inflatable member 74 is inflated so that it will engage those portions of the rubber mold indicated by numeral 76 and remain spaced from the remaining portions 78 of the wall of the rubber mold. The portions 78 form the open areas 79 in the mold and are filled with the plastic material as previously described and the finished casting formed thereby will have the design and configuration shown in FIG. 13, with the swirls 80 of the body of the casting formed by the plastic material occupying the open areas 79 of the mold and the open network or windows 82 formed in the body thereof as a result of the blocking between the inflatable member and the portions 76 of the inner wall of the mold.

While two particular shapes have been shown, it will be understood that the invention herein is not limited to these two shapes as any design and/or configuration and/or shape may be formed with windows or openings by employing the invention herein.

The plastic material that is used in this process is conventional and is identified in the market under the trademark "WEP." It is a product presently manufactured by Ashland Chemicals, a Division of Ashland Oil and Refining Company. This material has certain properties which when the casting is hardened is practically breakproof. It is a high-impact polyester resin. Obviously, other plastic materials having similar characteristics may be used in connection with this invention.

What is claimed is:

1. Means for casting and forming a decorative and ornamental cylindrical article having openings or windows in the cylindrical body or wall of a casting during the casting thereof to produce a decorative and ornamental cylindrical rigid body closed at one end thereof, said means comprising a rigid outer shell having an interior surface defining a cylindrical cavity closed at the bottom thereof and open at the top, with the diameter at the bottom less than at the top said interior surface of said outer shell having inwardly projecting surface and spaced recesses, a cylindrical resilient mold having an interior surface defining a cylindrical cavity closed at the bottom thereof and open at the top, with the diameter at the bottom less than at the top, the wall of said cylindrical mold having inwardly projecting surfaces and spaced recesses corresponding to those on the interior surface of said outer shell to engage therewith, a cylindrical inflatable member positioned in said mold, with the bottom of the inflatable member positioned above the bottom of the cylindrical mold and said inflatable member having portions which engage and contact portions of the inside surface of the cylindrical mold and other portions which are not in contact with portions of the surface of the cylindrical mold, said projections and recesses forming a decorative and ornamental design, whereby when a plastic material is introduced at the top opening between the mold and the exterior wall of the cylindrical inflatable member the areas or potions where the cylindrical inflatable member is in contact with the interior wall of the mold will prohibit the plastic material from forming a wall therebetween, thereby forming a decorative and ornamental design with openings or windows in the body of the casting and the nonengaging portions between the member and the mold form the decorative and ornamental body or wall of the casting, with the reduced bottom diameter forming a reduced neck at the end of the cylindrical body.

3. The means as set forth in claim 1 in which the resilient cylindrical mold is in one piece.

* * * * *

UNITED STATES PATENT OFFICE
CERTIFICATE OF CORRECTION

Patent No. 3,622,117  Dated November 23, 1971

Inventor(s) Lester N. Lerman, et al

It is certified that error appears in the above-identified patent and that said Letters Patent are hereby corrected as shown below:

Column 4, line 15, after "shell" insert -- formed of a plurality of detachably secured segments and -- ; line 17, "the", second occurrence, should read -- said; same line, after "top" insert a comma ; same line, "said" should read -- the -- ; line 18, "surface" should read -- surfaces -- ; line 19, after "mold" insert -- positioned within said outer shell and -- ; line 35, change "portions" to read -- portions -- .

Signed and sealed this 14th day of November 1972.

(SEAL)
Attest:

EDWARD M. FLETCHER, JR.
Attesting Officer

ROBERT GOTTSCHALK
Commissioner of Patents